United States Patent [19]
Nicklin

[11] 3,925,853
[45] Dec. 16, 1975

[54] BELT COUPLINGS

[75] Inventor: John Mills Nicklin, Auckland, New Zealand

[73] Assignee: John Edward Butler (New Zealand) Ltd., Auckland, New Zealand

[22] Filed: Nov. 18, 1974

[21] Appl. No.: 524,872

[52] U.S. Cl................ 24/75; 24/230 AM; 297/389
[51] Int. Cl.².................... A62B 35/60; A44B 17/00
[58] Field of Search......... 297/385, 389; 24/203 SB, 24/75, 201 D, 230 SL, 230 A, 230 AN, 24/230 AM

[56] References Cited
UNITED STATES PATENTS

| | | | |
|---|---|---|---|
| 2,098,461 | 11/1937 | Micallef | 24/230 SL |
| 3,364,532 | 1/1968 | Hatfield | 24/230 AM |
| 3,520,034 | 7/1970 | Glauser et al. | 297/389 X |
| 3,534,448 | 10/1970 | Hughes | 297/389 X |
| 3,542,426 | 11/1970 | Radke | 297/389 |
| 3,796,461 | 3/1974 | Cucheran et al. | 24/230 AM X |

*Primary Examiner*—Donald A. Griffin
*Attorney, Agent, or Firm*—Cushman, Darby & Cushman

[57] ABSTRACT

A two part (a latching part and a tongue part) vehicle safety belt and/or harness coupling wherein the tongue part is of unitary form comprising a plate from which is pressed a lipped tongue as to be disposed substantially normal to the plate whereby the tongue can be inserted through aligned apertures of a plate and a spring loaded slide of the latching part to captivate the slide between the lip and the plate of the latching part to interlock the coupling parts together. By increasing the spacing of the lip relative to its plate sufficient space can be provided between the two parts of the coupling, when interlocked, to enable an adjunct strap buckle(s), for example, a crotch strap buckle, to be fitted over the tongue to also be releasably engaged by the coupling.

4 Claims, 4 Drawing Figures

U.S. Patent  Dec. 16, 1975  3,925,853
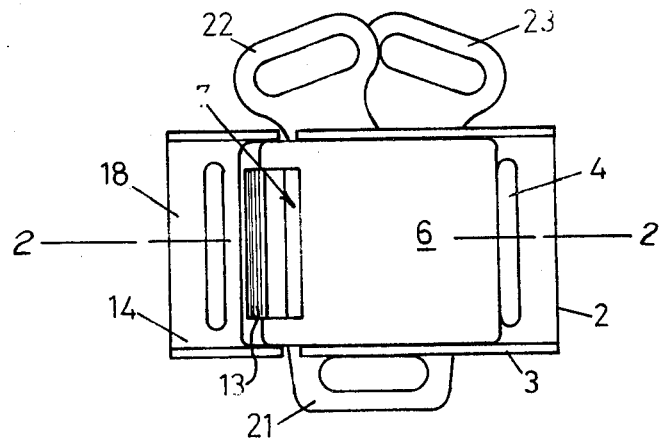
FIG. 1.
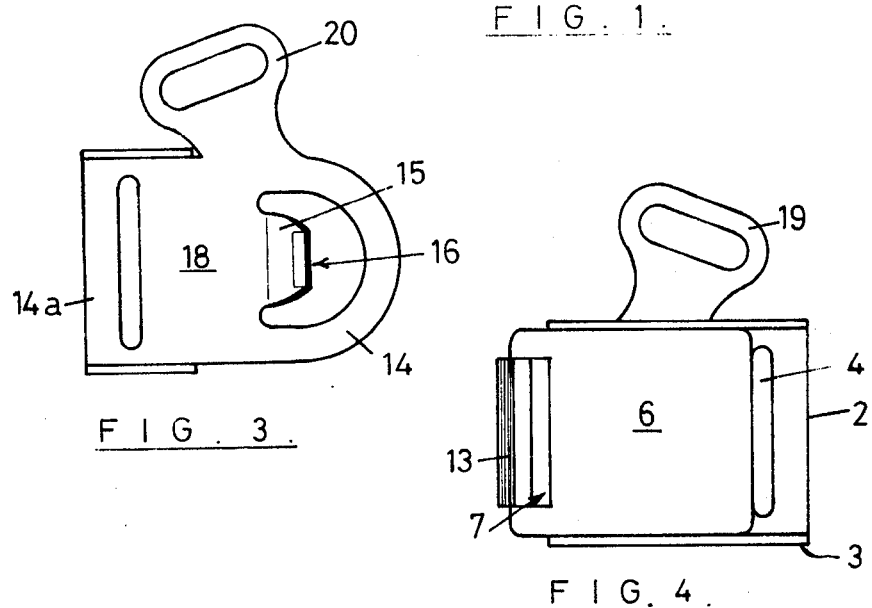
FIG. 3.
FIG. 4.
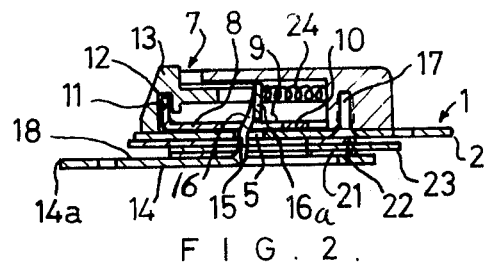
FIG. 2.

BELT COUPLINGS

BACKGROUND OF THE INVENTION

This invention relates to belt coupling, in particular a coupling suitable for a vehicle safety belt or harness.

The intention of this invention is to provide a two part belt coupling, being a latching part and a tongue part releaseably engageable with the latching part, wherein the tongue part is of unitary form requiring no assembly, per se, thereby being relatively inexpensive to manufacture and also in situ, being engageable with the latching part by movement of the two parts relative to one another in a direction substantially normal to the direction of tension of belt elements retained together by the coupling.

SUMMARY OF THE INVENTION

According to one aspect of this invention there is provided a belt coupling broadly comprising two parts being a tongue part releaseably engageable with a latching part, the latching part incorporating a spring biased slide tending to at least partially overlap an aperture formed in an adjacent plate element of the latching part and the tongue part comprising a plate from which is formed an integral tongue disposed toward a normal position relative to the adjacent face of the plate and incorporating a lip disposed substantially normal to the tongue and spaced from the aforesaid face of the plate, the arrangement and construction providing that the tongue can be inserted through the aperture of the latching part to engage the slide between the lip and the plate element of the latching member under the influence of its spring bias.

BRIEF DESCRIPTION OF THE DRAWINGS

FIG. 1 is a plan view of one form of the coupling depicted in the engaged state with adjunct separate shoulder and crotch buckles coupled thereto, and FIG. 2 is a cross-sectional view on Line 2—2 on FIG. 1 and, FIG. 3 and FIG. 4 are plan views of a tongue part and latching part respectively of a further form of the coupling depicted disengaged from each other, each part being modified to integrally incorporate a shoulder strap buckle.

DETAILED DESCRIPTION OF CERTAIN PREFERRED EMBODIMENTS

Referring now in particular to FIGS. 1 and 2, a latching part 1 of the coupling comprises a plate element 2 formed with lateral upstanding edges 3 and is adapted, such as by slot 4, at an end thereof for attachment to a belt (not shown). An aperture, preferably in the form of a transversely disposed slot 5, is formed substantially medially of the plate element 2.

A housing part 6 is retained, such as by screw 17, between the upstanding portions 3 of the plate element 2, the housing 6 having an open end 7 disposed away from the belt attachment slot 4. A slide 8, in the form of a plate, is positioned between the housing 6 and the plate element 2, the interior of the housing 6 accommodating slide 8 and other elements mentioned hereinafter. An aperture 9 is formed through the slide 8. An edge part 10 defining aperture 9 and disposed toward the belt attachment slot 4, tends as described hereinafter, to align substantially with the major centre line of slot 5 of plate 2. Referring to FIG. 2, plate 8 and edge 10 are depicted as dislodged from this described position.

An end 11 of the slide 8, disposed at the open end 7 of the housing 6, is bent normal to the main body of the slide 8 and engages a recess 12 in an operating slide 13. Slide 13 is biased by a spring 14 mounted within the housing 6 towards the open end 7 of the housing 6. Laterally positioned lugs (not shown) on slide 8 engage recesses of housing 6 preventing both slides 8 and 13 from being displaced from the housing 6 by the action of the spring 14. Preferably slide 13 includes an end piece which provides a finger grip for displacing both slides 13 and 8 against the spring influence.

A tongue part is formed from a plate 14 with tongue 15 being an integral part thereof connected along line A—A with plate 14. As with the catch part 1, one end 14a of the plate is adapted for connection to an end of a belt. Towards its opposing end a tongue 15 is formed by folding outwardly a "knock-out" central section of the plate. The tongue 15 is disposed towards a normal position relative to the face 18 of the plate 14, the tongue 15 being slightly inclined away from that end of the plate 14, and away from line A—A and generally perpendicular thereto adapted for attachment to a belt.

A lip 16 formed by pressing from the opposing face of the tongue 15 extends transversely on the underside of the tongue 15.

The lip 16 is disposed away from the face 18 of the plate 14 and preferably near the free end of the tongue 15. The lip 16 is formed to include a steep "rise" face or portion 16a disposed substantially parallel to the face 18 of the plate and a gradual tapering face leading to the free end of the tongue 15 such that the free end of the tongue 15, in cross-section, is tapered. This formation assists engagement of the coupling as described hereinafter.

In operation the tongue 15 is inserted through the slots 5 and 9 of the latching part 1. The slide 8 may be manually displaced or displaced by the entry of the tongue 15, for this reason tongue 15 has a tapered free end, against the edge 10. The displacement is temporary and under the influence of the spring 14 therefor the slide 8 will engage between the lip 16 and the plate element 2 of the latching part 1. Operation of slide 13 and thus slide 8 against the influence of the spring 14 enables release of the tongue 15 and thus disengagement of the coupling.

The spacing of the lip 16 from the face 18 of the plate 14 ensures that the two parts of the coupling closely mate in a substantially face to face relationship. The coupling is readily adaptable, by altering this spacing, for use in; a safety lap belt, as described above; a lap belt with a crotch strap by increasing this spacing to accommodate a crotch strap buckle such as buckle 21; and by further increasing this spacing to accommodate shoulder strap buckles such as buckles 22 and 23.

In a modified form of the invention shoulder strap buckles such as buckles 19 and 20 may be incorporated as integral parts of latching part 1 and tongue part 14 as depicted in FIG. 3 and FIG. 4.

In yet a further modified form of the invention (not shown) a pin may be incorporated co-planar of the slide 8 as an extension of edge 10 to extend into aperture 9 and tongue 15 is formed with a suitably positioned aperture to receive the pin; this pin aperture arrangement may be provided as an alternative to or in addition to the lip 16 to provide an interlock between the two parts of the buckle.

What is claimed is:

1. A belt coupling comprising:
   a. a latching member, said latching member including (i) a latch plate of a predetermined thickness having an aperture therein, (ii) a movable slide of a predetermined thickness adapted to slide on said latch plate, said slide having an aperture therein adapted to correspond to the aperture in said latch plate in a first position of said slide, (iii) means for biasing said slide to a second position wherein a portion of said slide overlaps the aperture in said latch plate while not completely covering the latch plate aperture, said biasing means allowing movement of said slide from said second position to said first position thereof, (iv) means for moving said slide against the bias of said biasing means,
   b. means formed with said latch member for connecting said latching member to a belt,
   c. a tongue member, said tongue member including (i) a tongue plate, (ii) a tongue integral with said tongue plate and having a portion thereof extending generally normal to said tongue plate from a line of connection therewith, and having an end thereof remote from said tongue plate, (iii) a lip formed integral with the end of said tongue remote from said tongue plate, said lip having a portion thereof extending generally parallel to said tongue plate in a direction away from said line of connection of said tongue with said tongue plate, and said lip portion being spaced from said tongue plate a predetermined distance generally at least as great as the thickness of said latch plate plus the thickness of said slide, and
   d. means formed with said tongue member for connecting said tongue part to a belt, whereby said tongue may be inserted through said apertures in said latch plate and said slide when said slide is in the first position thereof, and after return of said slide under the influence of said biasing means to the second position thereof said lip portion will engage a surface of said slide remote from said latch plate to thereby latch said latching member and said tongue member together.

2. A coupling as recited in claim 1 wherein said tongue includes means for camming said slide from the second position thereof toward the first position thereof upon insertion of said tongue into said apertures, whereby latching of said members is facilitated.

3. A coupling as recited in claim 1 further comprising:
   e. means formed with said latch member for connecting a second belt to said latching member, and
   f. means formed with said tongue member for connecting a second belt to said tongue member, and wherein said distance between said lip portion and said tongue plate is only slightly greater than the thickness of said latch plate plus the thickness of said slide plus the thickness of a buckle of a crotch belt whereby only one other buckle, a crotch buckle, may be disposed between said latching member and said tongue member.

4. A belt coupling comprising
   a. a latching member, said latching member including (i) a latch plate of a predetermined thickness having an aperture therein, (ii) a movable slide of a predetermined thickness adapted to slide on said latch plate, said slide having an aperture therein adapted to correspond to the aperture in said latch plate in a first position of said slide, (iii) means for biasing said slide to a second position wherein a portion of said slide overlaps the aperture in said latch plate while not completely covering the latch plate aperture, said biasing means allowing movement of said slide from said second position to said first position thereof, (iv) means for moving said slide against the bias of said biasing means,
   b. means formed with said latch member for connecting said latching member to a belt,
   c. a tongue member, said tongue member including (i) a tongue plate, (ii) a tongue integral with said tongue plate and having a portion thereof extending generally normal to said tongue plate from a line of connection therewith, and having an end thereof remote from said tongue plate, (iii) a lip formed integral with the end of said tongue remote from said tongue plate, said lip having a portion thereof extending generally parallel to said tongue plate in a direction away from said line of connection of said tongue with said tongue plate, and said lip portion being spaced from said tongue plate a predetermined distance at least as great as the thickness of said latch plate plus the thickness of said slide plus the thickness of a buckle of a third belt coupling member, whereby said buckle may also be latched to said latching member by said coupling, and
   d. means formed with said tongue member for connecting said tongue part to a belt, whereby said tongue may be inserted through said apertures in said latch plate and said slide when said slide is in the first position thereof, and after return of said slide under the influence of said biasing means to the second position thereof said lip portion will engage a surface of said slide remote from said latch plate to thereby latch said latching member and said tongue member together.

* * * * *